Patented May 6, 1952

2,595,416

UNITED STATES PATENT OFFICE 2,595,416

PRODUCTION OF MODIFIED FORMS OF ALUMINA

Louis Schmerling, Riverside, Ill., assignor to Universal Oil Products Company, Chicago, Ill., a corporation of Delaware No Drawing. Application September 29, 1948, Serial No. 51,855

15 Claims. (Cl. 23—141)

This invention relates to a process and several alternative variations thereof for preparing alumina in a highly catalytically active form when utilized individually or as a composite with other promoting substances in appropriate conversion reactions. More specifically, the invention concerns certain methods for the production of an improved alumina from an alumina sol or gel prepared from an intermediate aluminum compound. This application is related to my copending application Serial No. 51,853, filed September 29, 1948.

Alumina, either as the hydrate or in the anhydrous form as aluminum oxide, has been widely used in the art for many chemical conversion reactions in which a contact agent is essential or advantageous to the reaction. It has been employed, for example, as an adsorbent for the removal of foreign substances from liquids and gases, as in the removal of volatilized liquids from gases contaminated therewith, such as removing water vapor from gaseous oxygen. The oxide is also widely used as a dehydrating agent in processes for chemically dehydrating such organic compounds as alcohols for the production of olefins therefrom, as in the case of manufacture of cyclohexene by the dehydration of cyclohexanol. The activated forms of alumina which are considered to be merely various physical modifications of aluminum oxide are known for their pronounced catalytic activity and high adsorptive capacity. The catalytic or activated forms of alumina have been particularly utilized in the petroleum industry as catalyst or catalyst component in many types of hydrocarbon conversion reactions. Alumina may also be composited with other catalytically active metals or metallic compounds to form thereby catalyst composites for promoting selected conversion reactions in which the alumina component of the catalyst acts either as a support for the catalytically active component or as a promoter to enhance the activity of one or more other components. Typical of such uses for alumina is the production of an alumina supported nickel catalyst where the nickel is deposited in a finely divided state on the exposed surface of a porous alumina support.

In the above uses of alumina, the highly adsorptive or activated forms of material are desirable and in many cases essential to obtain the desired effect therefrom. Many types of aluminas and so-called aluminas presently available, however, do not have the preferred or essential physical characteristics for use in the intended conversion reactions, particularly the adsorptive capacity and catalytic activity of the so-called "activated" form of alumina. Among the relatively inactive forms of alumina are the alumina hydrates containing 1, 2 or 3 moles of water of crystallization per mole of alumina or may contain anhydrous alumina and the mono-, di- or trihydrate as a complex aggregate. The latter, commercial grades of alumina ore, including various crystalline modifications such as Gibbsite, Bohmite, bauxite, diaspore and other are among the naturally occurring forms of alumina which in their original condition are not catalytically active as such and comprise the group of aluminas containing gamma-alumina which may be treated in accordance with the present process for conversion into the present purified and highly activated alumina product.

Many aluminas presently available on the market and/or available from natural sources contain components other than alumina which may be considered as impurities because of their deleterious effect, in many cases, on the catalytic or absorptive properties of the alumina component. Thus, many aluminas offered on the market contain iron (generally as iron oxide), sodium (as salts or in combination with other components, such as double salts), silicon, calcium, barium, etc. which in many catalytic uses seriously reduce the activity and/or thermal stability of the alumina for the purposes intended. A silica-alumina composite containing sodium or iron, introduced into the composite, for example, via the sodium contained in the alumina is not as active as a cracking catalyst and is not as resistant to high temperatures as is the corresponding silica-alumina catalyst in which the sodium or iron contaminants are absent. The present invention has as one of its primary objectives the preparation of an activated form of alumina utilizing an alumina starting material containing gamma-aluminum oxide, the alumina in its original form being substantially inactive or only partially active as a contact agent. Another object of the invention is to provide a process for removing a major proportion of the non-alumina impurities from an alumina ore comprising gamma-aluminum oxide.

It is not contemplated herein to utilize as the alumina-containing starting material for treatment in accordance with the present process, a substance comprising wholly or in a substantial proportion thereof the refractory or condensed form of alumina designed in the literature as alpha-alumina which characterizes the structure of fused alumina appearing in such materials as rubies, sapphires, corundum, etc. The latter are apparently inert to the acidic reagent utilized in the present method of treatment and are not, therefore, to be considered within the intended scope of the term "gamma-alumina" as the reactive component of the starting material charged in the present process.

In accordance with one of its embodiments the present invention concerns a process for the preparation of an alumina sol which comprises reacting an alumina containing gamma-aluminum oxide with a theoretical excess of an organic acid containing at least 60% by weight of said acid at a temperature in excess of about 150° C., up to about 300° C., for a time sufficient to convert said gamma-alumina to the corresponding basic aluminum salt of said acid and hydrolyzing said salt to form said alumina sol.

Another embodiment of the invention relates to a process for the production of an alumina gel which comprises reacting an alumina containing gamma-aluminum oxide with acetic acid of at least 60% by weight concentration to form thereby basic aluminum acetate, hydrolyzing said acetate to form an aqueous dispersion of an alumina sol and adding to said aqueous alumina sol dispersion an aqueous solution of a water soluble ionic substance to precipitate said alumina gel.

Other objects and embodiments of the present invention will be referred to more specifically in the following further description of the methods and procedures utilized in the present process.

The process herein provided for the ultimate preparation of the present alumina product comprises the following sequence of steps or process stages in which an alumina starting material containing gamma-aluminum oxide, such as an impure alumina ore, exemplified, for example, by the least expensive natural source of alumina, the trihydrate, is mixed with an organic acid of at least 60% by weight concentration (preferably a low molecular weight member of the fatty acid series such as formic and acetic acids) in a quantity corresponding to an excess over the theoretical molar ratio required for converting said alumina to the mono basic acid salt thereof. The mixture of acid and alumina starting material is thereafter heated at a temperature in excess of about 150° C., up to about 300° C., preferably up to about 220° C. while maintaining the pressure sufficiently superatmospheric to maintain at least a portion of the acidic reactant in liquid phase. The reaction period required to convert the alumina to the aluminum salt of the acid varies with the particular acid selected and may require from about 0.5 to about 20 hours. The reaction mechanism for the formation of the basic aluminum acid salt is represented, for example, in the following equation in which acetic acid represents the organic acid reactant:

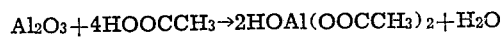

$$Al_2O_3 + 4HOOCCH_3 \rightarrow 2HOAl(OOCCH_3)_2 + H_2O$$

The corresponding reaction using an aluminum oxide trihydrate is represented in the following equation:

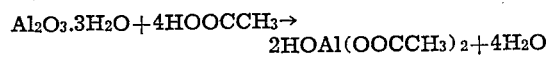

$$Al_2O_3 \cdot 3H_2O + 4HOOCCH_3 \rightarrow 2HOAl(OOCCH_3)_2 + 4H_2O$$

Suitable organic acids utilizable in the present reaction to form the basic aluminum acid salt include acetic acid and formic acid which, for reasons hereinafter specified are the preferred treating agents, trichloroacetic acid, dichloroacetic acid, monochloroacetic acid, oxalic acid, malonic acid, succinic acid, tartaric acid and others. Acids of the fatty acid series having ionization constants less than $1 \times 10^{-3}$ are preferred. Formic acid and acetic acid, containing at least 60% by weight of the acid in the reagent, are preferred, not only because of their relatively low cost, but further, because of their effectiveness in yielding the desired basic aluminum acid compound thereof in substantially quantitative yields. Treating agents containing less than about 60% by weight of the organic acid do not effect the desired conversion either at a practical rate or to a practical extent, the rate of conversion and the proportion of alumina converted to the acid salt increasing as the concentration of the reagent approaches the anhydrous acid. In the use of anhydrous formic and acetic acids, conversion to the corresponding basic aluminum acid salts is practically quantitative when the reaction conditions are maintained as above specified. At least four molecular proportions of acid to alumina must necessarily be charged into the reaction mixture to provide for the production of the monobasic acid salt and preferably this ratio of organic acid to alumina is above the theoretical requirement, from about 6 to 1 to about 12 to 1 in order to obtain maximum conversion at a reasonable rate.

The treatment of the charged alumina to form the basic aluminum acid salt comprising the intermediate product of the present process is effected at a temperature above about 150° C., preferably from about 180° to about 250° C. while maintaining the acid reagent in substantially liquid phase by utilizing superatmospheric pressure. At lower temperatures than about 150° C. the conversion of the alumina is sluggish and incomplete, the product, even after long reaction periods, containing an appreciable quantity of unconverted alumina charging material.

The basic aluminum acid salt, the product of treating alumina with the organic acid reagent, and usually insoluble in the excess acid, may be separated from said excess acid by filtration or merely admixed with water and subsequently converted to an aqueous dispersion of alumina sol in accordance with an alternative method of handling the reactants in the present process. The treatment of the reaction mixture containing excess acid and basic aluminum acid salt for removal of the acid therein may be effected by filtering off the salt and washing it with a suitable solvent for the acid such as water, until a major proportion of the acid has been dissolved away from the product. An alternative procedure comprises distilling the excess acid from the reaction mixture, preferably at a sub-atmospheric pressure, to vaporize the organic acid at a relatively lower temperature than at atmospheric pressure. It is generally sufficient in the case of most acids to merely add water to the reaction mixture and filter or reserve the entire mixture for the subsequent hydrolytic treatment of the basic aluminum acid salt therein for conversion to an aqueous dispersion of alumina sol.

In the formation of the alumina sol by the present method of hydrolyzing the intermediate basic aluminum acid salt, the salt is merely heated in the presence of water in which it is practically insoluble, at temperatures above the boiling point of the mixture, of from about 100° to about 300° C. (and therefore, at superatmospheric pressures to maintain the water substantially in liquid phase) until hydrolysis is complete, usually indicated by the formation of a clear or translucent solution comprising an aqueous dispersion of the alumina sol. The quantity of water required is generally a matter of convenience, although the amount must be sufficient to adequately disperse the sol. For this purpose an amount at least equal and preferably greater than the volume of salt hydrolyzed is utilized in the hydrolytic reaction. The reaction mechanism for the conversion of a typical basic aluminum acid salt, such as basic aluminum acetate, to alumina is indicated in the following equation:

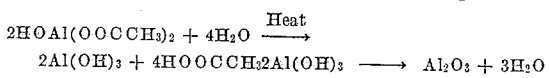

$$2HOAl(OOCCH_3)_2 + 4H_2O \xrightarrow{\text{Heat}}$$
$$2Al(OH)_3 + 4HOOCCH_3 \cdot 2Al(OH)_3 \longrightarrow Al_2O_3 + 3H_2O$$

One embodiment of this invention concerns a method of preparing an alumina hydrogel from an alumina sol formed by hydrolysis of basic aluminum acid salt. The transformation of alumina sol to the corresponding gel may be effected, in accordance with one method of treatment, by introducing into the aqueous dispersion of the alumina sol comprising the reaction mixture of the prior hydrolytic reaction, a water soluble ionizable substance, such as an electrolyte, preferably added to the sol dispersion as an aqueous solution of said ionizable substance. The transformation of the sol to gel is generally completed within a short time interval from the instant the ionizable substance is added to the aqueous dispersion of alumina sol and after a short period of induction, generally not exceeding about 20 seconds. The interval of time during which the sol-gel transformation takes place enables the aqueous admixture of sol and electrolyte to be comminuted into droplets during the time lag and thereby provide for the production of substantially spherical semi-rigid particles of the alumina hydrogel following the transformation. The hydrogel is characteristically a semi-solid, gelatinous mass upon precipitation from an aqueous dispersion of the sol and assumes roughly the shape of the container in which the sol to gel transformation takes place. If alumina spheres are desirable as the ultimate product, the aqueous mixture of the sol and ionizable substance or gel precipitant may be dispersed into droplets immediately after the sol and precipitant are mixed and if then suspended in an immiscible fluid medium as the transformation of the mixture to alumina gel takes place, the droplet assumes the shape of a spherical, semi-rigid globule which may be subsequently dehydrated to form a substantially spherical, porous rigid particle of alumina. The latter particle may be utilized as such or impregnated with catalytic promoting substances as hereinafter provided to form a catalyst for the conversion of a fluid charging stock and provide certain advantages therein associated with its spherical shape.

Suitable ionizable, water-soluble substances which effect the conversion of the alumina sol to a gel and thus act as gel precipitants include the mineral acids, organic acids having an ionization constant above about $1 \times 10^{-3}$, bases and water-soluble ionizable salts. Mineral acids such as hydrochloric, sulfuric, phosphoric, etc. are effective gel precipitants, but are not generally preferred in the present process because of the peptizing action of such acids on the alumina gel, making the recovery of the gel relatively difficult because of the passage of the finely divided peptized alumina gel particles through the usual filtering means when the precipitated alumina gel is recovered by filtering the aqueous suspension formed from the sol dispersion. Carboxylic acids, such as the low molecular weight members of the fatty acid series having an ionization constant above about $1 \times 10^{-3}$ may also be utilized to coagulate the alumina sol to the gel. Among the preferred carboxylic acids for this purpose are: mono- and dichloroacetic acid, oxalic acid, malonic acid, etc. Other organic acids such as picric acid and the sulfonic acids such as benzenesulfonic acid also cause gelation of the alumina sol. The preferred gelling agents comprise the bases, and particularly ammonium hydroxide, which may be subsequently volatilized from the gel without depositing a foreign residue on the finally recovered alumina product. Other utilizable bases include the alkali metal hydroxides such as sodium hydroxide, various amines having a basic reaction in aqueous solution, and preferably the readily volatilized amines such as dimethyl amine and diethyl amine. Ionizable, water-soluble salts may also be employed as precipitants of the alumina gel from the aqueous sol and include, among others, the alkali metal salts such as the chlorides, sulfates, nitrates, etc. capable of yielding an alkali metal ion in an aqueous solution thereof, and the ammonium salts such as ammonium chloride, ammonium bromide, ammonium sulfate, ammonium formate, ammonium acetate, etc. which have the advantage over other salts that the salt residue remaining in the body of the alumina gel upon drying the coagulated, filtered alumina precipitate may be vaporized therefrom during subsequent calcination. The preferred salts comprise those which volatilize when the dried alumina gel is subsequently dried or calcined at temperatures above about 100° C., up to about 800° C. and consequently the above mentioned ammonium salts are considered the preferred precipitants of the alumina gel. It is to be emphasized, however, that apparently any water-soluble ionizable salt may be utilized as geling agent herein and that it may be substantially completely removed from the gel by washing with sufficient water. The salt is preferably added to the aqueous dispersion of the alumina sol as a saturated aqueous solution thereof and generally only small amounts are required to initiate the gelation. That the gelatinous precipitate obtained from the hydrolyzed basic aluminum acid salt actually comprises alumina hydrogel and not merely precipitated basic aluminum acid salt is established by the fact that the precipitation is initiated by the mere addition of a relatively small number of ions into the sol dispersion and the amount of ionizable substance required is much less than the stoichiometric ratio required to cause chemical conversion of the basic aluminum acid salt to aluminum hydroxide and alumina gel.

When it is desired to form the alumina gel in a single operation, starting with the basic aluminum acid salt, the latter may be hydrolyzed and the resulting alumina sol converted to the corresponding gel in a one-stage procedure. The method comprises hydrolyzing the salt in an aqueous solution of an electrolyte or other ionizable substance, the ions of which effect the sol-to-gel transformation in the aqueous medium. One of the preferred reagents for this purpose is an ammonium compound, such as ammonium hydroxide, added to the mixture of water and basic aluminum acid salt subjected to hydrolysis in accordance with the procedure and at the temperature and pressure conditions hereinabove provided. The product is an aqueous suspension of alumina gel or a mixture of the gel in water. The product is filtered, washed and/or dried to recover the alumina in a manner similar to the procedure described above.

Following the precipitation of the gel, the resulting, somewhat gelatinous mass may be filtered to recover the alumina gel from the excess water or composited while in aqueous suspension or after filtration with other salts, metals, or metal oxides to form catalytic particles for utilization in an appropriate catalytic conversion reaction. The wet filter cake may also be dried, broken into particles and calcined to yield a highly absorptive, activated alumina. The final product obtained by means of the present methods of production has a low density and a high surface to mass ratio.

Flocculent material having a large superficial area and adsorptive capacity may also be recovered from the basic aluminum acid intermediate product by thermal dissociation thereof, effected by calcining or thermally decomposing said salt. Basic aluminum acetate, for example, when calcined at temperatures of from about 400° to about 600° C., and especially in the presence of an oxygen-containing atmosphere, yields a white fluffy alumina product having a highly porous structure which makes it especially attractive for use as a catalyst support or as an alumina catalyst itself. The calcination yields acetone, acetic acid and carbon dioxide as by-products in accordance with the following proposed reaction mechanism:

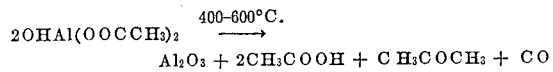

$$2OHAl(OOCCH_3)_2 \xrightarrow{400-600°C.} Al_2O_3 + 2CH_3COOH + CH_3COCH_3 + CO$$

In accordance with still another alternative method of recovering a highly porous alumina product from a basic aluminum acid salt, the latter salt, such as basic aluminum acetate, may be contacted with an alcohol, such as an aliphatic alcohol, at a temperature sufficient to effect alcoholysis of the acid radical in the basic aluminum acid salt. Utilizing basic aluminum acetate, for example, as the starting material, the salt is heated to a temperature of from about 150° to about 250° C. and is contacted at this temperature with vapors of a suitable alcohol passed over the acetate until substantially complete conversion of the salt to alumina has taken place. The alumina product is a dry, fluffy solid residue, and the by-product alcohol acetate may be recovered from the effluent vapors of the reaction. The preferred alcohols comprise the low molecular weight members of the aliphatic series, such as methanol, ethanol, propanol, etc. although the reaction is not necessarily limited by the molecular weight of the alcohol reactant.

Yet another method of recovering an activated form of alumina consists in evaporating to dryness the alumina sol, prepared for example, by the hydrolysis of basic aluminum acetate.

In the preparation of a catalyst composite containing the present alumina product, the alumina is admixed or commingled with the promoter component desirably before drying or calcining the alumina gel recovered from its aqueous suspension. For this purpose, the alumina sol, the precipitated gel in admixture with its aqueous suspending medium, or the filter cake obtained by filtering the gel suspension may be impregnated with an aqueous solution of a salt of the metal which will utimately form the promoter component of the catalyst composite and the resulting impregnated gel treated in such manner as to precipitate the promoter component on the alumina support. Thus, for example, in the preparation of an active hydrocarbon cracking catalyst containing the present alumina composited with silica, the alumina gel herein obtained is commingled with an aqueous solution of an alkali metal silicate, such as water glass, and the mixture treated with a mineral acid, such as hydrochloric acid, to precipitate silica on the alumina gel particles. The solids (a mixture or composite of the respective alumina and silica gels) are recovered, for example, by filtration, the filter cake washed to remove soluble impurities, particularly alkali metal ions, dried and calcined at approximately 500° to 800° C. to form the final catalyst composite. An especially preferred method of forming an alumina-silica cracking catalyst comprises adding an aqueous solution of water glass to the alumina sol hereinabove mentioned and formed by hydrolysis of a basic aluminum acid salt in the presence of water. The sodium ion of the water glass (sodium metasilicate) serves to initiate precipitation or coagulation of the alumina sol to form the alumina gel precipitate, while simultaneously, the acidic ion present in the alumina sol solution (resulting from hydrolysis of the basic aluminum acid salt) is sufficient to hydrolyze the sodium metasilicate and precipitate silica. The co-precipitation of the two catalyst components by metastasis results in a catalyst composite in which the components are in intimate association and one which is highly catalytically active.

In the preparation of another typical alumina-containing catalyst composite comprising an alumina supported nickel catalyst which is useful in catalyzing hydrogenation reactions, the alumina gel filter cake recovered by the present procedure, the dried alumina gel, or an aqueous suspension of the alumina gel is intimately commingled with an aqueous solution of a nickel salt, such as nickel chloride, to impregnate the alumina gel particles with said salt solution. The resulting alumina impregnated with nickel salt may then be treated with, for example, ammonium carbonate to precipitate nickel carbonate within the gel, the product is then filtered and the recovered filter cake dried and calcined, for example, in the presence of an oxygen-containing atmosphere to form a nickel oxide-alumina composite, or, in the presence of hydrogen, to form an alumina supported metallic nickel catalyst.

An alumina-chromia catalyst useful in dehydrogenation reactions is prepared by a method similar to the above procedure by impregnating the alumina gel either in a dried, wet, or water-suspended state with a chromium salt, such as chromium sulfate, followed by precipitating chromium hydroxide on the alumina particles by treating the impregnated alumina gel with a basic reagent, preferably ammonium hydroxide, filtering the composite, drying and calcining the same to form particles of the final catalyst composite.

An alternative method for the production of an alumina-chromia catalyst composite comprising a modification of the method hereinabove provided for the production of the alumina sol involves the simultaneous hydrolysis of a mixture of basic aluminum acid salt and chromium acid salt in the presence of water by means of the hydrolyzing procedure hereinabove provided. The product is an aqueous admixture of alumina and chromia sols when an electrolyte or other ionizable substance is absent from the aqueous mixture. When, on the other hand, an electrolyte or other ionizable substance is present in the aqueous hydrolysate, the product is a mixture of chromia and alumina gels appearing as a co-precipitate. For example, a mixture of chromium acetate and a basic aluminum acid salt heated in the presence of water at a temperature of from about 100° to about 300° C. for a period of from about one hour to about 10 hours, and necessarily at a superatmospheric pressure will yield a translucent aqueous suspension of alumina and chromia sols. The corresponding gels are co-precipitated upon the addition of a water-soluble ionizable substance to the sol such as ammonium hydroxide. The precipitated gels may be filtered, dried and calcined, if desired to form a highly active alumina-chromia catalyst composite. When the mixture of the above acid salts and water contains an electrolyte, the gel forms in situ as hydrolysis takes place and the product alumina-chromia composite is obtained directly without intermediate sol formation.

Basic aluminum acetate has been previously prepared by the art, but the prior methods of preparation depend upon procedures not inherent or common to the methods herein utilized and the alumina product derived therefrom contains impurities of varying identity and amounts which makes the alumina product unsuitable for many purposes, especially as a catalyst support where such impurities have an adverse effect on the catalytic activity or life of the catalyst. Typical prior art procedures for the preparation of basic aluminum acetate involves metastasis between an alumina salt and the acetate salt of another element, such as barium acetate. The basic aluminum acetate products presently on the market and prepared by the above procedures contain such impurities as the ions of sodium, calcium, iron, barium, etc. in significant quantities. I have found that when such commercial basic aluminum acetate is heated with water, the product is a gel and not a sol.

In the present method of preparation, many of the impurities present in the original alumina charging stock are converted to the salts of the acid employed in the preparation of the basic aluminum acid intermediate product of the present process. Many of these salts are soluble in the acid used. Others remain in solution in the aqueous alumina sol solution formed in the subsequent hydrolytic reaction stage of the process and do not precipitate with the alumina gel upon treating the sol suspension with a gelling agent. When the alumina gel is subsequently filtered, impurities such as ferric acetate, remain in the filtrate and are thus separated from the alumina product which is retained on the filter. The resulting recovered alumina is a highly purified material, especially suitable for use as a catalyst and as a catalyst component.

Other than its use for catalytic and contact purposes, the present alumina product may be employed as a mordant in dyeing operations; in compounding synthetic rubbers where the alumina may be added as a whitening compound or as a filler for the rubber; in the preparation of pigments for paints, etc.; in the formulation of pharmaceuticals where the basic aluminum acetate may also be utilized and in cosmetic preparations. The peptized sol may also be mixed with an excess of an organic water-soluble compound such as an alcohol, acetone, acetic acid, etc. and the gel precipitated therefrom by adding one of the aforementioned gelling agents such as a base or ionizable salt to form a viscous, solid or semi-solid mass of alumina gel which may be incorporated into compositions as a thickening agent or as a viscous carrier for pigments, etc. The sol formed by hydrolysis of the basic aluminum acid salt may be concentrated from its aqueous dispersion by evaporating a portion of the water therefrom until the sol suspension approaches the desired viscosity. Concentration of the sol to a composition containing greater than 60 weight per cent alumina results in the precipitation of the gel which, however, is reversed again to the sol by the addition of water thereto.

The invention is further illustrated in the following examples which are cited merely for purposes of illustration, with no intent, however, to unduly limit the scope of the invention in strict accordance therewith.

EXAMPLE I

*Formation of basic aluminum acid salts*

10 parts by weight of anhydrous alumina (a product of the Harshaw Chemical Company) was heated with 103 parts by weight of glacial acetic acid at a temperature of 180° C. and at a pressure of 50 atmospheres of nitrogen in a rotating autoclave for 6 hours. The contents of the autoclave were thereafter cooled and filtered and the filter cake washed with water to remove acetic acid. The cake was then dried at 110° C. The yield of product, which was a granular white salt insoluble in water, was 28 parts by weight. The theoretical yield, on the basis of 100% conversion of the alumina to basic aluminum acetate, is 31.7 parts by weight.

In a similar procedure utilizing alumina trihydrate as the starting material (the material commercially known as "Alorco") the final product was similar to the material recovered in the use of anhydrous alumina as starting material. In this procedure 10 parts by weight of the alumina trihydrate was heated with 101 parts by weight of glacial acetic acid at a temperature of 150° C. for 7 hours in a rotating autoclave at an initial pressure of nitrogen of 50 atmospheres. At the end of the indicated reaction period, the autoclave was cooled and the contents filtered. The product was basic aluminum acetate in a yield of 20.5 parts by weight corresponding to a theoretical yield of 20.8 parts by weight.

The fact that substantially anhydrous acetic acid is the preferred reagent in the conversion of alumina to the basic aluminum acetate is shown in the following results wherein 20 parts by weight of anhydrous alumina was heated with 100 parts by weight of 50% acetic acid at a temperature of 180° C. in a rotating autoclave charged with nitrogen at an initial pressure of 50 atmospheres. After 7 hours at the above conditions, the alumina was recovered chiefly unchanged from the reaction mixture. Under similar conditions utilizing 75% acetic acid, 80% of the alumina was converted to the desired basic aluminum acetate.

In the following run, formic acid was utilized in place of the glacial acetic acid of the above runs. 10.5 parts by weight of alumina trihydrate (the commercial product "Alorco") was heated with 120 parts by weight of 90% formic acid at a temperature of 180° for 5 hours in a rotating autoclave charged to an initial nitrogen pressure of 50 atmospheres. The yield of product (16.5 parts by weight) represents an almost quantitative conversion of the alumina to basic aluminum formate.

In a similar procedure utilizing succinic acid, 49 parts by weight of basic aluminum succinate was recovered from the reaction in which 10 parts by weight of alumina trihydrate was charged.

Alumina (15 parts by weight as alumina trihydrate) reacted readily with dichloroacetic acid (102 parts by weight of 100% acid) at 160° C. for 6 hours in an autoclave at atmospheric pressure. The reaction product was a solid salt which, however, went into solution when mixed with water. The solubility of the product in water is believed to be the result of hydrolysis of the dichloroacetic acid yielding hydrochloric acid in aqueous solution which is of sufficient concentration to dissolve the alumina.

EXAMPLE II

*Formation of an aqueous alumina sol from a basic aluminum acid salt*

170 parts by weight of the basic aluminum acetate formed according to the process of Example I was added to 1120 parts by weight of water and heated at a temperature of 180° C. in a rotating autoclave for four hours. The product was a uniform, translucent liquid. The product as recovered from the autoclave represented substantially complete hydrolysis of the acetate salt charged. The aqueous sol was grayish white by reflected light and almost water white by transmitted light. Water could be removed from the sol by distillation without precipitation of alumina gel until the concentration of alumina in the aqueous sol dispersion approached approximately 60% by weight. When additional water was removed, alumina gel precipitated, but this was reversible to the sol by the addition of water to the mixture.

EXAMPLE III

*Formation fo granular alumina via gelation of alumina sol*

The aqueous dispersion of alumina sol prepared by the hydrolysis of a basic aluminum acid salt in accordance with the process of Example II may be treated in the following manner for the formation of an alumina gel therefrom. Filtration of the gel followed by drying at 100–800° C. yields a porous, activated alumina.

The use of acids as gelling agents was shown by the coagulation of the gel on the addition of chloroacetic acid (ionization constant $1.5 \times 10^{-3}$), oxalic acid (ionization constant $3.8 \times 10^{-2}$), malonic acid (ionization constant $1.6 \times 10^{-3}$), and picric acid (ionization constant $1.6 \times 10^{-1}$) as dilute aqueous solutions thereof to the aqueous sol dispersion prepared as in Example II above. The use of acids having ionization constants below about $1 \times 10^{-3}$, as for example, formic acid (ionization constant $1.8 \times 10^{-4}$), acetic acid (ionization constant $1.8 \times 10^{-5}$) did not cause the precipitation of alumina gel from the aqueous alumina sol dispersion. On the addition of the acid gelling agent, a time lag between the addition of the acid and complete gelation of from about 10 to about 20 seconds was evident.

A strong mineral acid, such as hydrochloric acid, added to the aqueous dispersion of alumina sol results in the precipitation of a milky white aqueous suspension of alumina gel which is rather difficult to filter because of the tendency of the fine particles of alumina gel to clog the pores of the filter paper. The recovered filter cake, after drying, did not represent a 100% recovery of the alumina gel and a portion of the alumina appeared in the filtrate or finely divided particles of peptized alumina.

The addition of a dilute aqueous solution of ammonium hydroxide to the alumina sol dispersion caused gelation to a gelatinous mass which was sufficiently rigid to hold its shape in the container, but was readily filtered for removal of excess water therefrom. The recovered gel was dried at about 100° C. to form a light, fluffy alumina product in an almost quantitative yield.

EXAMPLE IV

*Alternative means of converting basic aluminum acetate or alumina sol to alumina*

The production of alumina by the interaction of basic aluminum acetate and an alcohol is shown in an experiment in which 20 parts by weight of basic aluminum acetate was heated at 180° C. with 100 parts by weight of methyl alcohol. During the reaction methyl acetate was formed and approximately 8.5 parts by weight of granular alumina was recovered from the reaction mixture. The reaction was carried out in a rotating autoclave at the pressure developed by heating the methyl alcohol to the above temperature. A similar process involving basic aluminum acetate (25 parts by weight) and isopropyl alcohol (100 parts by weight) at 180° C. yielded granular alumina (17 parts by weight) and isopropyl acetate.

An alternative method for conversion of the alumina sol of Example II to granular alumina is illustrated by the following example. The alumina sol prepared by treatment of 190 parts by weight of basic aluminum acetate with 1300 parts by weight of water was evaporated to dryness in a convection oven at 110° C. yielded 61 parts by weight of solid which was readily crushed to a powder all of which went through a 30 mesh sieve. The apparent bulk density of the product was 0.62. Comparison of this material with a commercial grade of alumina as carrier for a dehydrogenation catalyst showed that this material was superior in that it yielded a markedly more active catalyst.

I claim as my invention:

1. A process which comprises commingling an alumina containing gamma-aluminum oxide with a carboxylic acid of at least 60% by weight concentration and in an amount corresponding to at least four molecular proportions of acid to alumina, heating the resultant mixture to a temperature of from about 150° C. to about 300° C. under sufficient superatmospheric pressure to maintain a substantial portion of the acid in liquid phase and for a time sufficient to convert said gamma-aluminum oxide to a basic aluminum salt of said acid, and thereafter converting said basic aluminum salt to alumina.

2. The process of claim 1 further characterized in that said basic aluminum salt is converted to alumina by reaction thereof with an alcohol.

3. The process of claim 1 further characterized in that said basic aluminum salt is converted to alumina by contacting the same, at a temperature of from about 150° C. to about 250° C., with vapors of an alcohol.

4. A process which comprises commingling an alumina containing gamma-aluminum oxide with a carboxylic acid of at least 60% by weight concentration and in an amount corresponding to at least four molecular proportions of acid to alumina, heating the resultant mixture to a temperature of from about 150° C. to about 300° C. under sufficient superatmospheric pressure to maintain a substantial portion of the acid in liquid phase and for a time sufficient to convert said gamma-aluminum oxide to a basic aluminum salt of said acid, and hydrolyzing said basic aluminum salt in an aqueous medium at a temperature of from about 100° C. to about 300° C. under sufficient pressure to maintain the water of said aqueous medium substantially in liquid phase.

5. The process of claim 4 further characterized in that said acid is a fatty acid.

6. The process of claim 4 further characterized in that said acid is formic acid.

7. The process of claim 4 further characterized in that said acid is acetic acid.

8. The process of claim 4 further characterized in that said alumina comprises alumina trihydrate.

9. The process of claim 4 further characterized in that said aqueous medium contains a water-soluble ionizable substance whereby to form alumina gel during the hydrolysis.

10. The process of claim 9 further characterized in that said ionizable substance is ammonium hydroxide.

11. A process which comprises commingling an alumina containing gamma-aluminum oxide with a carboxylic acid of at least 60% by weight concentration and in an amount corresponding to at least four molecular proportions of acid to alumina, heating the resultant mixture to a temperature of from about 150° C. to about 300° C. under sufficient superatmospheric pressure to maintain a substantial portion of the acid in liquid phase whereby to convert said gamma-aluminum oxide to a basic aluminum salt of said acid, and hydrolyzing said basic aluminum salt in the presence of water at a temperature of from about 100° C. to about 300° C. under sufficient pressure to maintain the water substantially in liquid phase, thereby forming an alumina sol, and adding an aqueous solution of an ionizable substance to said sol to precipitate an alumina hydrogel.

12. The process of claim 11 further characterized in that said ionizable substance is a base.

13. The process of claim 11 further characterized in that said ionizable substance is ammonium hydroxide.

14. The process of claim 11 further characterized in that said ionizable substance is an ammonium salt volatilizable at below about 500° C.

15. The process of claim 11 further characterized in that said alumina hydrogel is calcined at a temperature of from about 100° C. to about 800° C. to form activated alumina.

LOUIS SCHMERLING.

REFERENCES CITED

The following references are of record in the file of this patent:

UNITED STATES PATENTS

| Number | Name | Date |
| --- | --- | --- |
| 59,238 | Lewis | Oct. 30, 1866 |
| 1,132,709 | Eichelbaum | Mar. 23, 1915 |
| 2,011,292 | Koch | Aug. 13, 1935 |
| 2,019,415 | Jochem | Oct. 29, 1935 |
| 2,086,499 | Hennig | July 6, 1937 |
| 2,141,477 | Losch | Dec. 27, 1938 |
| 2,258,099 | Patrick | Oct. 7, 1941 |
| 2,336,597 | Connolly | Dec. 14, 1943 |
| 2,378,155 | Newsome | June 12, 1945 |
| 2,390,272 | Riesmeyer | Dec. 4, 1945 |
| 2,411,806 | Riesmeyer | Nov. 26, 1946 |

OTHER REFERENCES

Richardson et al.: General College Chemistry, pages 420–421, Henry Holt & Co. (1940).